Figure 4:
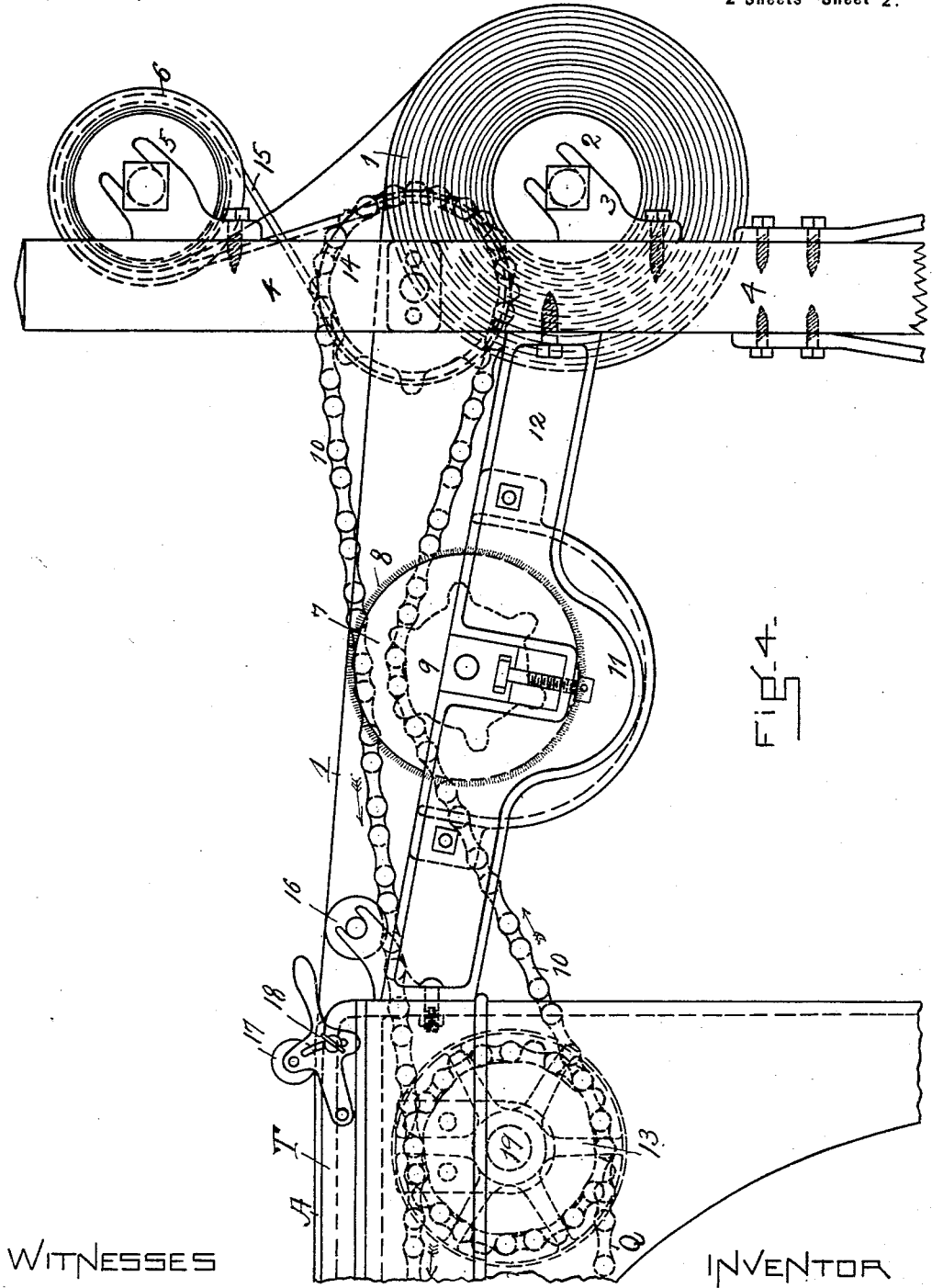

No. 653,828. Patented July 17, 1900.
A. SWEENEY.
MACHINE FOR CUTTING SHEETS OF UNVULCANIZED RUBBER.
(Application filed Apr. 15, 1899.)
(No Model.) 2 Sheets—Sheet 1.
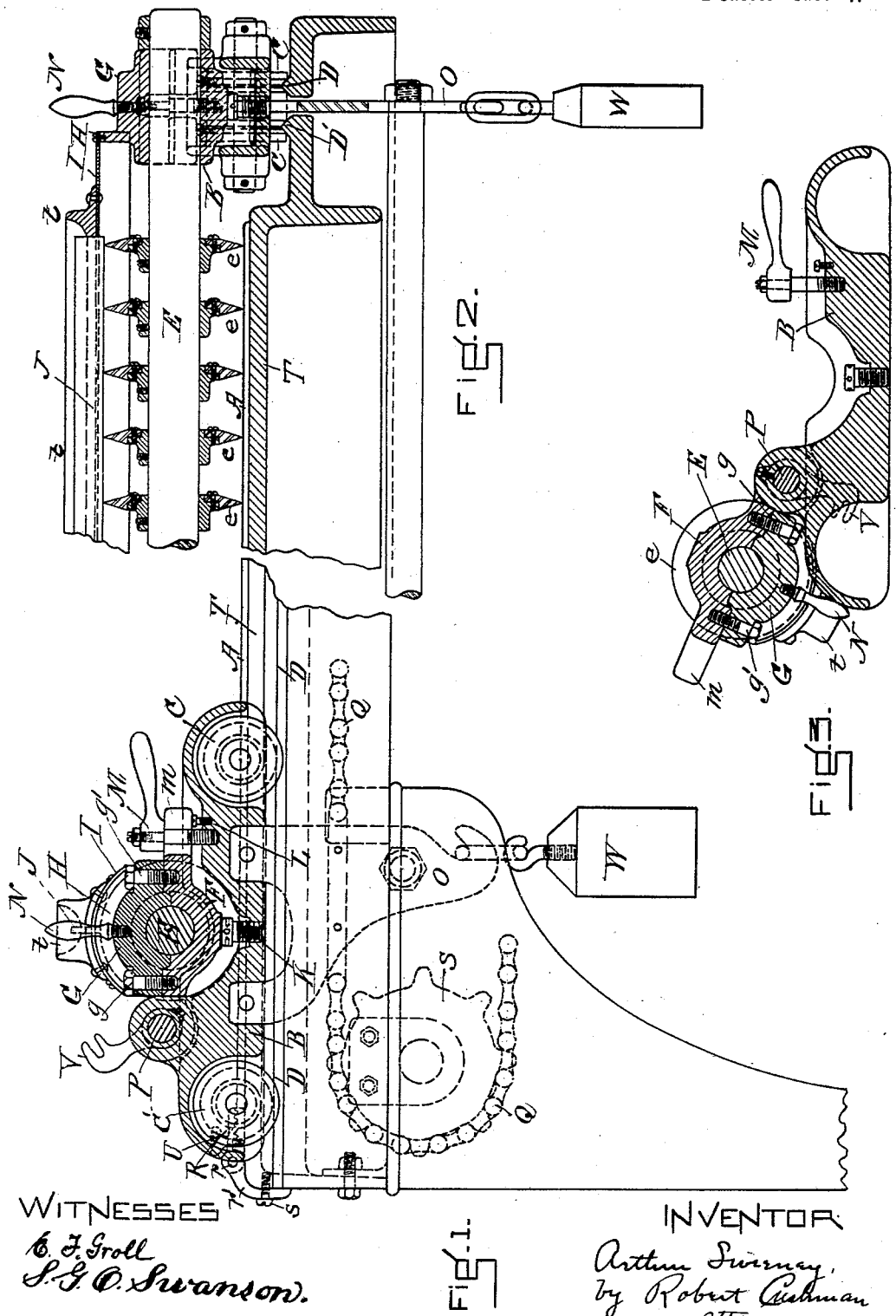

No. 653,828. Patented July 17, 1900.
A. SWEENEY.
MACHINE FOR CUTTING SHEETS OF UNVULCANIZED RUBBER.
(Application filed Apr. 15, 1899.)
(No Model.) 2 Sheets—Sheet 2.

WITNESSES
E. F. Iroll
S. G. O. Swanson.

INVENTOR
Arthur Sweeney,
by Robert Cushman
attorney.

UNITED STATES PATENT OFFICE.

ARTHUR SWEENEY, OF PROVIDENCE, RHODE ISLAND.

MACHINE FOR CUTTING SHEETS OF UNVULCANIZED RUBBER.

SPECIFICATION forming part of Letters Patent No. 653,828, dated July 17, 1900.

Application filed April 15, 1899. Serial No. 713,129. (No model.)

*To all whom it may concern:*

Be it known that I, ARTHUR SWEENEY, a citizen of the United States of America, and a resident of Providence, county of Providence, and State of Rhode Island, have invented certain new and useful Improvements in Machines for Cutting Sheets of Unvulcanized Rubber, of which the following is a specification.

One object of my invention is to provide a machine for cutting sheets of material which are of such character as to render cutting by ordinary means difficult, if not practically impossible, and which is especially adapted to the work of cutting unvulcanized sheet-rubber into strips such as are used in the manufacture of pneumatic rubber tires for the wheels of vehicles. The special adaptation of this invention to this last-named purpose is, I believe, thoroughly characteristic, and I therefore address the description of my invention to a machine designed for that purpose. The rubber tubes forming the tires are made up from strips of unvulcanized rubber, whose edges are folded together and the seam sealed by a narrow strip of unvulcanized rubber, and then the whole is vulcanized. At present the strips for the tubes are cut from a larger sheet of rubber by hand. The sheet of unvulcanized rubber is laid upon a table. The widths desired for the strips are marked by chalk-lines, and then the workman cuts each strip upon the chalk-line with a sharp knife drawn by hand. As the rubber is in a plastic condition sticky and lacking in the firmness and elasticity of vulcanized rubber, the cutting can be done only with wet knives. Otherwise the rubber sticks to the blade, crinkles, and is drawn out of shape. If once drawn out of shape, the rubber is ruined, as it will not return to its proper shape owing to its want of elasticity. As each strip has to be cut separately by hand, the cutting is necessarily slow and causes great waste, for the reason that if the cutter runs off the chalk-line even a little a variation of greater or less circumference, as the case may be, results in the finished tube, and when the air-pressure is put in the tube in the process of "blowing off" or "turning" the tube the tube will burst. The greatest accuracy in the widths of the strips is required. With my invention these strips may be cut with mechanically-perfect accuracy in any desired widths without waste and with much greater rapidity than by hand. I accomplish this result as follows: I lay a sheet of the rubber to be cut upon a table or platform, hold it in position by means of clamps or jaws at either end, and operate to and fro upon the sheet a cutter consisting of circular rotating knives which have a progressive rolling contact with the table. These knives act as splitting-knives and cut the rubber by a pressure substantially normal to the line of cut, and not as draw-knives nor as shears. In the condition in which the rubber has to be cut a draw-knife or shear, whatever be the shape of the shear-blade, has a tendency to pull the rubber out of shape and crinkle it.

At the point where the rolling knives of my invention part the rubber the blades and their opposing surface are relatively at rest, or substantially so, and consequently cannot pull the rubber out of shape. The knives, in any desired number, are borne upon a common axle supported by a reciprocating carriage moving along the table upon trucks and rails or in any suitable manner.

Another object of my invention is to provide a means for automatically chalking one side of the rubber. This has to be done in order to prevent the strips sticking together in their subsequent operations and is now done by hand. I accomplish the result by a cylindrical brush revolving in a trough of chalk-dust and sweeping one side of the sheet of rubber as it passes from its roll to the cutting-table.

In the accompanying drawings, Figure 1 is a vertical longitudinal section of the reciprocating carriage bearing the cutter in operative position and showing in side elevation one end of the cutting-table and power-transmitting device. Fig. 2 is a vertical cross-section of said table, carriage, and cutter in operative position upon the table. Fig. 3 is a vertical longitudinal section of said carriage bearing the cutter in elevated position for the return of the carriage. Fig. 4 is a side elevation of the other end of the table, of the rubber-chalking device, and of the support for the roll of material to be cut, with the actuating devices therefor.

Similar characters indicate like parts in all the figures.

T is the cutting-table, covered with a sheet of leather-board A or some other suitable material which will provide a firm surface and still not dull the blades of the cutter which operates upon it. The table T may be of any desired length, but is preferably adapted to the length of the strip which is desired to be cut.

B is the carriage, supported by the grooved wheels C C', running upon the V-rails D D' at the side of table T. A similar carriage operating on similar rails is provided on the opposite side of the table.

The cutter consists of the shaft E, supported at either end by and bearing upon said carriages, and the circular knives e e e. These knives when in operative position make contact with the cutting-surface A. They are secured to shaft E by means of set-screws and may be set at any desired distance apart in order to cut strips of any desired widths.

F is a frame journaled on the carriage B at P and contains the end bearing for the cutter-shaft E. It is pivoted at the rear end to the carriage at P. The bearing for shaft E is completed by the arched cover G, which is secured to F by the screw-bolts $g$ and $g'$. F and G together form the bearing for E. The arch G is provided with a flange or shoulder H, which supports an arched cross-beam I above the blades e e of the cutter. Along the top of the beam I is a slit in which is inserted a strip of felt J, one edge of which depends below the inner concave surface of beam I and makes contact with the blades e e. Above this slit and felt J is a trough $t$.

K and L are adjustment-screws for adjusting the height of the frame F G, and consequently of the cutter, above the cutting-surface A. The forward end of F is provided with a slot $m$, which permits the outward movement of the clamp M when the cutter-bearing is to be elevated.

N is a handle for elevating the frame F of the cutter. Depending from the carriage is the hanger O, which holds the weight W, and to which is attached the chain belt Q for imparting motion to the carriage.

S is a sprocket-wheel for chain Q.

R is a pair of jaws for holding the sheet of rubber extended upon the table T, said jaws being operated by a thumb-screw U and supported by the rod $r$, which extends across the table.

V is a hook attached to the rear end of carriage, designed to engage and support rod $r$, which supports the jaws R, when the cutter is in its elevated position for the return of the carriage along the table. Rod $r$ is removably secured to the end of the table by screw $s$, passing through the curved straps $r'$.

Referring now to Fig. 4, 1 is a roll of the sheet-rubber to be cut, rolled upon the beam 2, supported by the hooks 3, attached to the framework 4. 5 is another similar beam supported in a similar manner for the purpose of reeling off the strip of cloth 6, which is rolled with the rubber 1 to keep successive layers thereof from sticking together. 7 is a cylinder covered with a soft brush 8. Attached to the cylinder 7 is the sprocket-wheel 9, by which the brush may be revolved by the chain 10. The brush 8 revolves in the trough 11, which holds chalk-dust. Trough and brush are supported by framework 12. The machine is driven by the shaft 19, to which power is transmitted by any usual device. On the shaft 19 the sprocket-wheel 13 is keyed, and chain 10 transmits the requisite movements to sprockets 9 and 14. A pulley on the same shaft with sprocket 14 transmits movement to the cloth-beam 5 by means of the belt 15. 16 is an idler-roller extending the width of the table for supporting the sheet of rubber 1 as it is drawn out upon the table T. 17 is a clamp-roller for holding the rubber in place after it is spread out upon the table. Said roller is mounted at either end in a pivoted adjustable bracket, which may be held at the desired elevation by means of the thumb-screw 18.

Such being the construction of my machine, its operation is as follows: The cutter-carriage is brought to the end of the table nearest the roll of rubber 1. The clamp M is turned into line with the slot $m$ in the forward end of frame F, in the position shown in Fig. 1, thus enabling the cutter and all the parts supported by frame F to be elevated, swinging on pivot P. The cutter is then elevated to the position shown in Fig. 3, the operator using the handle N therefor. The blades of the cutter are thereby removed from their operative position upon the table. The rod $r$ is dropped into the hooks or notches V. The edge of the rubber strip 1 is inserted between the jaws R, which are firmly set by the thumb-screw U. Clamp 17 is loosened. The carriage is then started backward along the table, receiving its motion from the chain Q, which is attached to the carriage in any suitable manner, as to hanger O. Chain Q passes around sprockets S and 13 at the two ends of the table, respectively, and receives its motion from power applied through belt-pulley to the shaft 19 of sprocket 13 in the ordinary manner. As the carriage moves along, bearing the jaws, which clutch the rubber, the strip of rubber is drawn out upon the table, passing from the roll 1 over the brush 8 and supporting idler-roller 16. The chain belt 10, passing around sprockets 13 and 14 and over sprocket 9, imparts to the roller-brush 8 a rotating movement in the direction opposite to the movement of the sheet of rubber 1 and covers one side of the same with chalk-dust picked up on brush 8 in its passage through trough 11. Adjoining and attached to sprocket 14 is a belt-pulley connected with the cylinder or beam 5 by the belt 15. As the rubber unrolls this beam 5 revolves and is adapted to reel up the cloth 6, which is rolled with the rubber to prevent its layers from sticking together.

When the carriage reaches the opposite end of the table, having drawn out the sheet of rubber upon the table, the jaws R are removed from the hook V and secured to the end of the table in some convenient manner, as by screws $s$ and straps $r'$. Clamp 17 at the other end of the table is clamped down and held by thumb-screw 18, and the sheet of rubber is then ready for the cutting. The cutter is lowered into its operative position, as shown in Fig. 1, and secured there by clamp M, which is turned across the slot in the forward part of frame F, the cutter bearing on and severing the rubber sheet which lies on the cutting-surface A. The driving mechanism is then reversed and the carriage moves forward, the cutter preserving a relation of progressive rolling contact with surface A and cutting the sheet of rubber into strips.

The strip of felt J, protruding through the slot in beam I and trough $t$, has been previously saturated with water poured into trough $t$. Felt J depends into contact with the blades of the cutter and keeps them moist as they roll forward, thus preventing their sticking to the rubber. When the carriage has moved forward to the end of the table, the cutter is again elevated, as shown in Fig. 3, the strips which have been cut are severed from the sheet of rubber by a knife drawn by hand, and the sheet is again drawn out upon the table, precisely as before, for another cutting traverse of the carriage B. The contact of the cutter with the surface A may be adjusted with the greatest nicety by the adjusting-screws K and L, which regulate the distance of the bearing for shaft E above the cutting-surface. The weight W, suspended on the hanger O, serves to keep the cutter pressed toward the surface A. Owing to the resistance offered by the rubber the cutter might otherwise roll upon the rubber without cutting through it, if not held down by sufficient weight.

What I claim, and desire to secure by Letters Patent, is—

1. In a sheet-cutting machine the combination of a cutter, a cutting-surface opposed thereto, the cutter and opposed cutting-surface movable relatively to each other in the line of cut, and having a progressive rolling contact whereby the cutting pressure between the cutter and the opposed cutting-surface is substantially normal to the line of cut at the traveling point of contact and means for drawing and holding a sheet of material to be cut between the cutter and the opposed cutting-surface and a trough above said cutter provided with a strip of felt or other suitable material depending into contact with said cutter and adapted to moisten the edge of the same.

2. In a sheet-cutting machine a work supporting and cutting surface, circular cutting-knives adapted to roll upon said surface and having a progressive rolling contact with said surface whereby the cutting pressure between the knives and said surface is substantially normal at the traveling point of contact, means for producing a relative motion between said surface and knives, means for drawing and holding a sheet of material to be cut between the knives and the opposed work supporting and cutting surface, and means for withdrawing the cutter from said supporting and cutting surface and a trough above said knives provided with a strip of felt or other suitable material depending into contact with the blades of said knives and adapted to moisten the same.

3. In a sheet-cutting machine, a work supporting and cutting table, a reciprocating cutter-carriage, a cutter supported and carried thereby, the cutter consisting of a plurality of circular rolling knives having a progressive rolling contact with the work-supporting table whereby the cutting pressure exerted between the cutter and the work-supporting table is substantially normal at the point of contact, means for reciprocally moving the cutter-carriage across the work-supporting table, means for withdrawing the cutter from the work-supporting table, means for drawing and holding a sheet of material to be cut between the cutter and the opposed work-supporting table, and a trough provided with a strip of depending felt or other suitable material adapted to moisten the blades of said knives.

4. In a machine for cutting sheet-rubber, a cutting and work-supporting table, a reciprocating cutter-carriage supporting and carrying a cutter consisting of a plurality of circular rolling knives adapted to roll upon said table and having a progressive rolling contact with said table, whereby the cutting pressure exerted between the knives and the table is substantially normal at the point of contact, a trough provided with a strip of depending felt adapted to moisten said knives; means for reciprocally operating said carriage across the table, means for elevating the cutter from the table, means for drawing out the sheet of rubber to be cut upon the table and holding it in place.

5. In a machine for cutting sheet-rubber, a cutting and work-supporting table, a reciprocating cutter-carriage supporting and carrying a cutter consisting of a plurality of circular rolling knives adapted to roll upon said table and having a progressive rolling contact with said table, whereby the cutting pressure exerted between the knives and the table is substantially normal at the point of contact, a trough provided with a strip of depending felt adapted to moisten said knives; means for reciprocally operating said carriage across the table, means for elevating the cutter from the table, means for drawing out the sheet of rubber to be cut upon the table and holding it in place and a weight suspended from said carriage and adapted to urge the cutters into cutting contact with the table.

6. In a machine for cutting sheet-rubber, a cutting and work-supporting table, a circular cutter adapted to roll upon said table and supported by a bearing-frame, a carriage upon which said bearing-frame is journaled, and adjustment-screws adapted to raise and lower one end of said frame with relation to said carriage, and a trough mounted on said frame above said cutter, provided with a slit through which depends a strip of felt or other suitable material into contact with said cutter.

Signed by me at Providence, Rhode Island, this 13th day of April, 1899.

ARTHUR SWEENEY.

Witnesses:
 JAMES A. PIRCE,
 BENJAMIN R. MOWRY.